(12) United States Patent
Han et al.

(10) Patent No.: US 12,009,154 B2
(45) Date of Patent: Jun. 11, 2024

(54) MULTILAYER ELECTRONIC COMPONENT WITH CONDUCTIVE RESIN LAYER

(71) Applicant: SAMSUNG ELECTRO-MECHANICS CO., LTD., Suwon-si (KR)

(72) Inventors: Ji Hye Han, Suwon-si (KR); Jung Min Kim, Suwon-si (KR); Byung Woo Kang, Suwon-si (KR); Hong Je Choi, Suwon-si (KR); Hye Jin Park, Suwon-si (KR); Sang Wook Lee, Suwon-si (KR); Bon Seok Koo, Suwon-si (KR); Jung Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 245 days.

(21) Appl. No.: 17/682,023

(22) Filed: Feb. 28, 2022

(65) Prior Publication Data

US 2023/0119122 A1 Apr. 20, 2023

(30) Foreign Application Priority Data

Oct. 19, 2021 (KR) .................. 10-2021-0139074

(51) Int. Cl.
*H01G 4/232* (2006.01)
*H01G 4/30* (2006.01)

(52) U.S. Cl.
CPC .......... *H01G 4/2325* (2013.01); *H01G 4/30* (2013.01)

(58) Field of Classification Search
None
See application file for complete search history.

(56) References Cited

U.S. PATENT DOCUMENTS 3,891,901 A * 6/1975 Booe .................. H01G 4/32
361/309
4,797,780 A * 1/1989 Moser ................ H01G 4/2325
29/25.42

(Continued)

FOREIGN PATENT DOCUMENTS

KR 10-2017-0118584 A 10/2017
KR 20180012178 A * 2/2018

(Continued)

*Primary Examiner* — Timothy J. Dole
*Assistant Examiner* — Muhammed Azam
(74) *Attorney, Agent, or Firm* — MORGAN, LEWIS & BOCKIUS LLP

(57) ABSTRACT

A multilayer electronic component includes a body including a dielectric layer and an internal electrode, and an external electrode disposed on the body. The external electrode includes an electrode layer connected to the internal electrode, an intermetallic compound layer disposed on the electrode layer and including a first intermetallic compound and glass, and a conductive resin layer disposed on the intermetallic compound layer and including a conductive connection portion including a second intermetallic compound and a low-melting-point metal, a plurality of metal particles, and a resin. A ratio of a length of a first direction component of a region having the first intermetallic compound, with respect to a length of a first direction component of the intermetallic compound layer, is 20% or more.

23 Claims, 12 Drawing Sheets

(56) References Cited

U.S. PATENT DOCUMENTS

| | | | | |
|---|---|---|---|---|
| 6,370,013 | B1* | 4/2002 | Iino | H01L 23/642 |
| | | | | 361/309 |
| 8,134,825 | B2* | 3/2012 | Otsuka | H01G 2/065 |
| | | | | 361/308.1 |
| 9,627,133 | B2* | 4/2017 | Otani | H01G 4/012 |
| 10,319,527 | B2* | 6/2019 | Kim | H01G 4/232 |
| 10,446,320 | B2* | 10/2019 | Kim | H01G 4/30 |
| 10,454,445 | B2* | 10/2019 | Lee | H01F 27/292 |
| 10,580,567 | B2* | 3/2020 | Lee | H01F 41/041 |
| 10,655,036 | B2* | 5/2020 | Uemura | B32B 27/365 |
| 10,726,996 | B2* | 7/2020 | Han | H01G 4/232 |
| 10,770,230 | B2* | 9/2020 | Koo | H01G 4/2325 |
| 10,903,010 | B2* | 1/2021 | Koo | H01G 4/2325 |
| 11,069,483 | B2* | 7/2021 | Takasaki | H01G 4/1227 |
| 2003/0189817 | A1* | 10/2003 | Yoshii | H01G 4/248 |
| | | | | 361/773 |
| 2015/0054388 | A1* | 2/2015 | Itagaki | H10N 30/50 |
| | | | | 336/200 |
| 2017/0025223 | A1* | 1/2017 | Bultitude | B23K 1/008 |
| 2017/0301468 | A1* | 10/2017 | Kim | H01G 4/30 |
| 2017/0358397 | A1* | 12/2017 | McConnell | H01G 4/002 |
| 2018/0240592 | A1* | 8/2018 | Morita | H01G 4/30 |
| 2018/0286594 | A1* | 10/2018 | Kim | H01G 4/248 |
| 2018/0374642 | A1* | 12/2018 | Akiyoshi | H05K 3/3426 |
| 2019/0157006 | A1* | 5/2019 | Han | H01G 4/008 |
| 2019/0237262 | A1* | 8/2019 | Nagaoka | H01G 4/008 |
| 2019/0295773 | A1* | 9/2019 | Kim | H01G 4/30 |
| 2020/0176189 | A1* | 6/2020 | Koo | H01G 4/2325 |
| 2020/0339806 | A1* | 10/2020 | Nemoto | C08J 9/0066 |
| 2021/0202154 | A1* | 7/2021 | Wakabayashi | H01F 27/32 |
| 2022/0122770 | A1* | 4/2022 | Jung | H01G 4/30 |

FOREIGN PATENT DOCUMENTS

| | | | |
|---|---|---|---|
| KR | 20190004630 A | * | 1/2019 |
| KR | 20190004631 A | * | 1/2019 |
| KR | 20190058239 A | * | 5/2019 |
| KR | 10-2203372 B1 | | 1/2021 |

* cited by examiner

MULTILAYER ELECTRONIC COMPONENT WITH CONDUCTIVE RESIN LAYER

CROSS-REFERENCE TO RELATED APPLICATION(S)

This application claims benefit under 35 USC 119(a) of Korean Patent Application No. 10-2021-0139074 filed on Oct. 19, 2021 in the Korean Intellectual Property Office, the entire disclosure of which is incorporated herein by reference for all purposes.

TECHNICAL FIELD

The present disclosure relates to a multilayer electronic component.

BACKGROUND

Multilayer Ceramic Capacitors (MLCCs), as multilayer electronic components, are chip-type capacitors mounted on the printed circuit boards of various electronic products, such as imaging devices, for example, liquid crystal displays (LCDs) and plasma display panels (PDPs), computers, smartphones, and mobile phones, to charge or discharge electricity.

Such a multilayer ceramic capacitor may be used as a component of various electronic devices due to small size, high capacity, and ease of mounting thereof. In recent years, the multilayer ceramic capacitor has also been miniaturized and has had higher capacity due to the miniaturization and high performance of electronic devices. As such, the importance of securing high reliability of the multilayer ceramic capacitor is increasing.

As a method of securing high reliability of the multilayer ceramic capacitor, to absorb tensile stress generated in a mechanical or thermal environment and prevent cracks caused by stress, a technique for applying a conductive resin layer to an external electrode is disclosed.

The conductive resin layer serves to electrically and mechanically bond a sintered electrode layer and a plating layer of an external electrode of the multilayer ceramic capacitor, and to protect the multilayer ceramic capacitor from mechanical and thermal stress depending on the process temperature and bending impact of the board during mounting of the circuit board.

However, since the conductive particles of the conductive resin layer are dispersed, the conductive resin layer and the sintered electrode layer are formed with a weak polymer-metal bond, which may cause lifting at the interface.

In addition, since the conductive particles of the conductive resin layer are dispersed and electrical connectivity is secured by hopping conduction, a problem of weak electrical conductivity may occur.

In addition, since the sintered electrode layer and the conductive resin layer are bonded by the bonding strength of the resin, there is a problem in that bonding strength may be weak. In detail, lifting may occur at the interface between the sintered electrode layer and the conductive resin layer due to outgassing generated from the conductive resin layer in a high-temperature environment such as reflow.

In addition, when the rigidity of the conductive resin layer is relatively low, the inside of the conductive resin layer may be torn in addition to the lifting at the interface between the sintered electrode layer and the conductive resin layer due to outgassing generated from the conductive resin layer in a high-temperature environment such as reflow.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer electronic component having improved reliability and electrical conductivity.

An aspect of the present disclosure is to provide a multilayer electronic component in which the occurrence of lifting at the interface between a conductive resin layer and a sintered electrode layer due to weak adhesion therebetween may be suppressed.

An aspect of the present disclosure is to provide a multilayer electronic component to prevent the problem of weak electrical conductivity caused because conductive particles included in a conductive resin layer are dispersed and electrical connectivity is thus secured by hopping conduction.

An aspect of the present disclosure is to suppress the occurrence of lifting at the interface between a sintered electrode layer and a conductive resin layer due to outgassing generated from the conductive resin layer in a high-temperature environment such as reflow.

An aspect of the present disclosure is to suppress that the inside of a conductive resin layer is torn in addition to lifting at the interface between a sintered electrode layer and a conductive resin layer, due to outgassing generated from the conductive resin layer in a high-temperature environment such as reflow or the like.

According to an aspect of the present disclosure, a multilayer electronic component includes a body including a dielectric layer and an internal electrode; and an external electrode disposed on the body. The external electrode includes an electrode layer connected to the internal electrode, an intermetallic compound layer disposed on the electrode layer and including a first intermetallic compound and glass, and a conductive resin layer disposed on the intermetallic compound layer and including a conductive connection portion including a second intermetallic compound and a low-melting-point metal, a plurality of metal particles, and a resin. A ratio of a length of a first direction component of a region having the first intermetallic compound, with respect to a length of a first direction component of the intermetallic compound layer, is 20% or more.

According to an aspect of the present disclosure, a multilayer electronic component includes a body including a dielectric layer and an internal electrode; and an external electrode disposed on the body. The external electrode includes an electrode layer connected to the internal electrode, an intermetallic compound layer disposed on the electrode layer and including a first intermetallic compound and glass, and a conductive resin layer disposed on the intermetallic compound layer and including a conductive connection portion including a second intermetallic compound and a low-melting-point metal, a plurality of metal particles, and a resin. A sum of the number of particles having a Feret diameter of 10 μm or more, among particles of the conductive connection portion and the plurality of metal particles, is N1, a total number of the particles of the conductive connection portion and the plurality of metal particles is N2, and a ratio (N1/N2) of the N1 to the N2 is 15% or more.

According to an aspect of the present disclosure, a multilayer electronic component includes a body including a dielectric layer and an internal electrode; and an external electrode disposed on the body. The external electrode includes: an electrode layer connected to the internal electrode, an intermetallic compound layer disposed on the electrode layer and including a first intermetallic compound and glass, and a conductive resin layer disposed on the intermetallic compound layer and including a conductive connection portion including a second intermetallic compound and a low-melting-point metal, a plurality of metal particles, and a resin.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
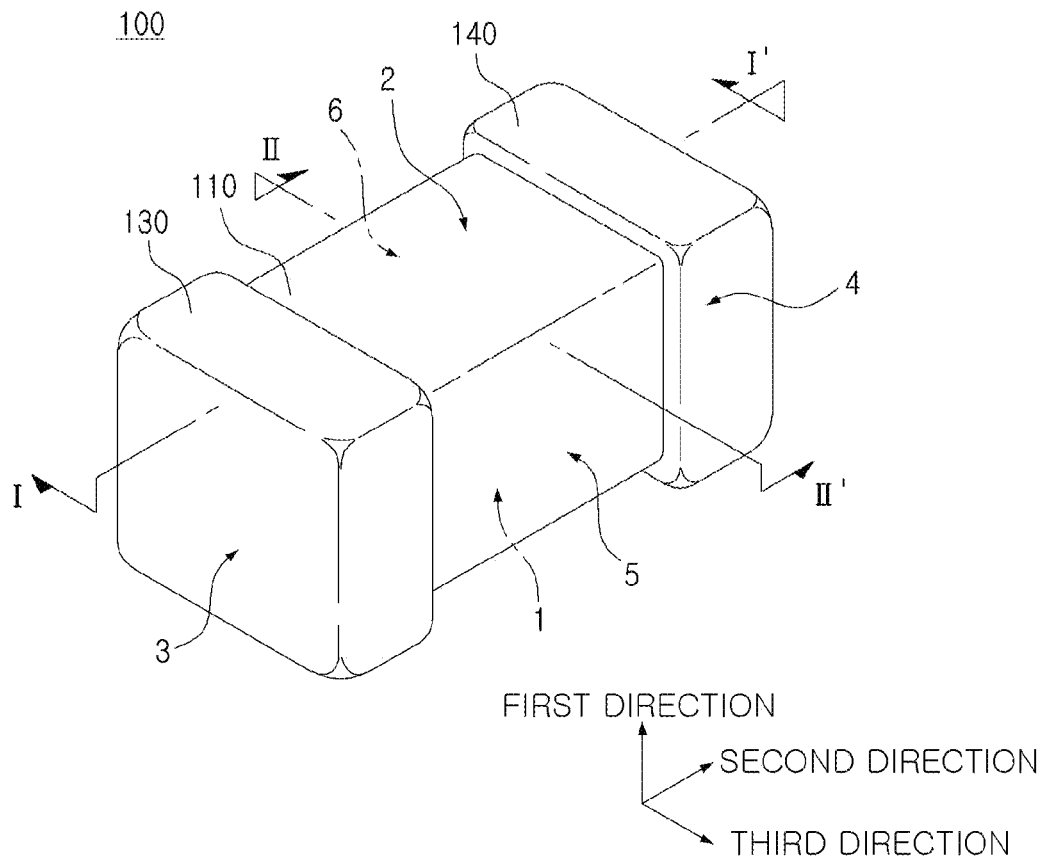
FIG. 1 schematically illustrates a perspective view of a multilayer electronic component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 2:
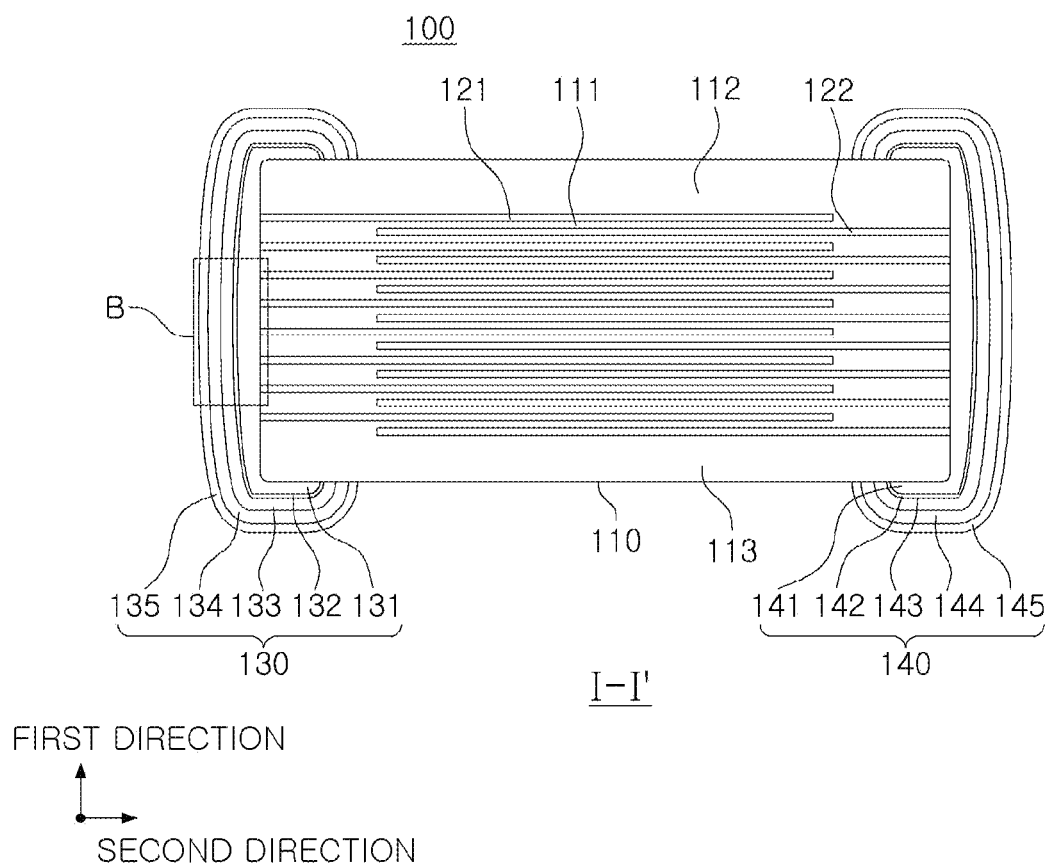
FIG. 2 schematically illustrates a cross-sectional view taken along line I-I' of FIG. 1.
Figure 3:
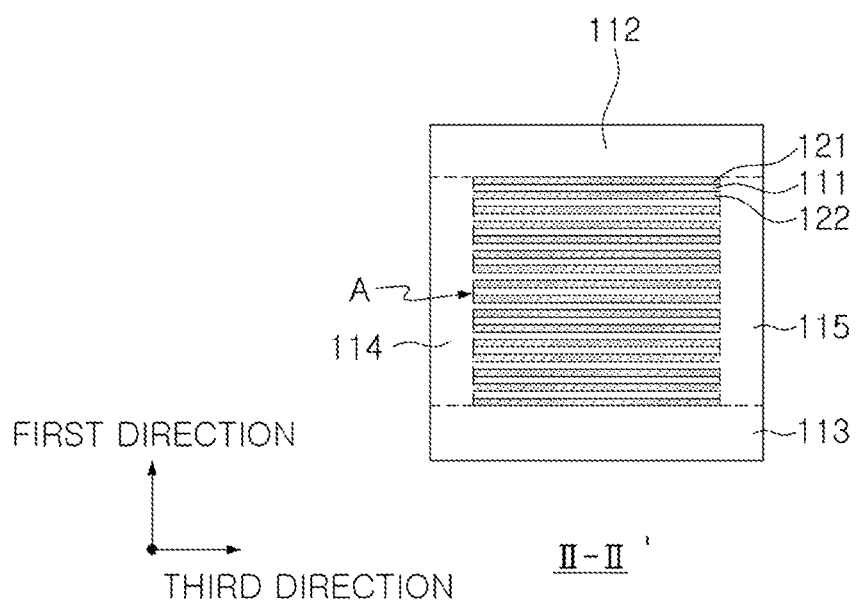
FIG. 3 schematically illustrates a cross-sectional view taken along line II-II' of FIG. 1.
Figure 4:
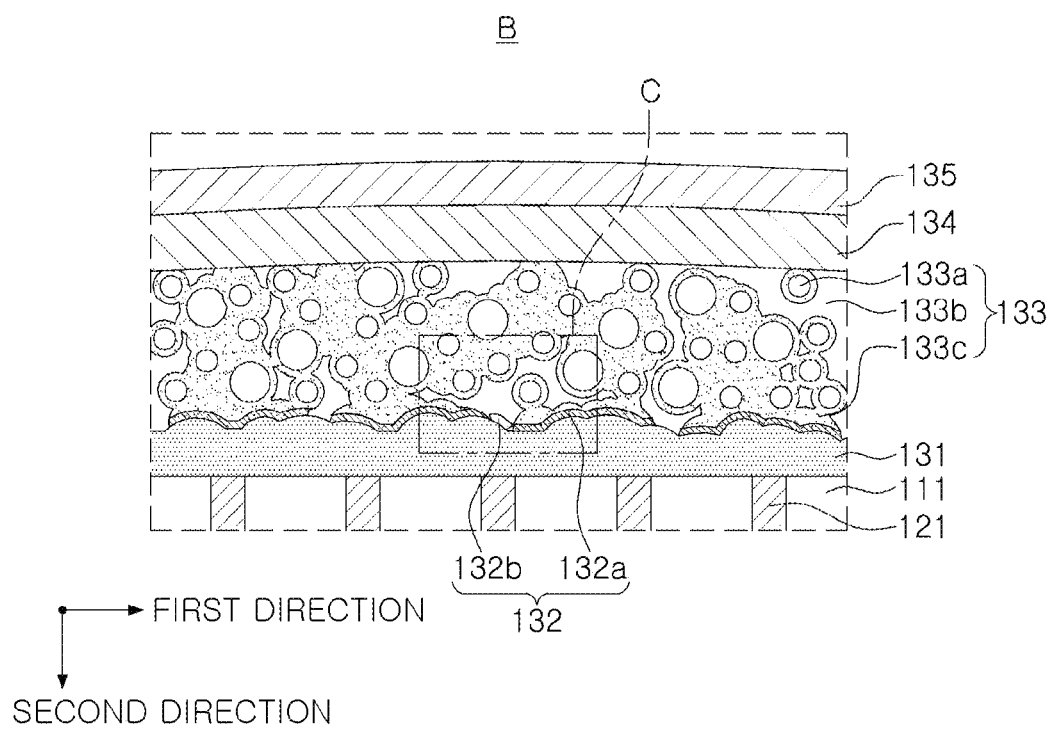
FIG. 4 is an enlarged view of region B of FIG. 2.
Figure 5:
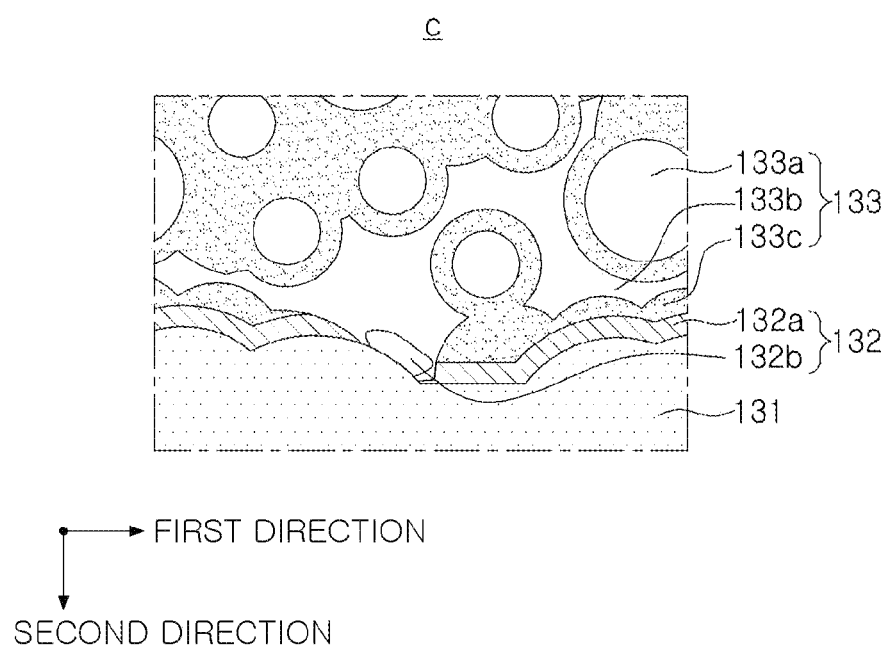
FIG. 5 is an enlarged view of region C of FIG. 4.
Figure 9:
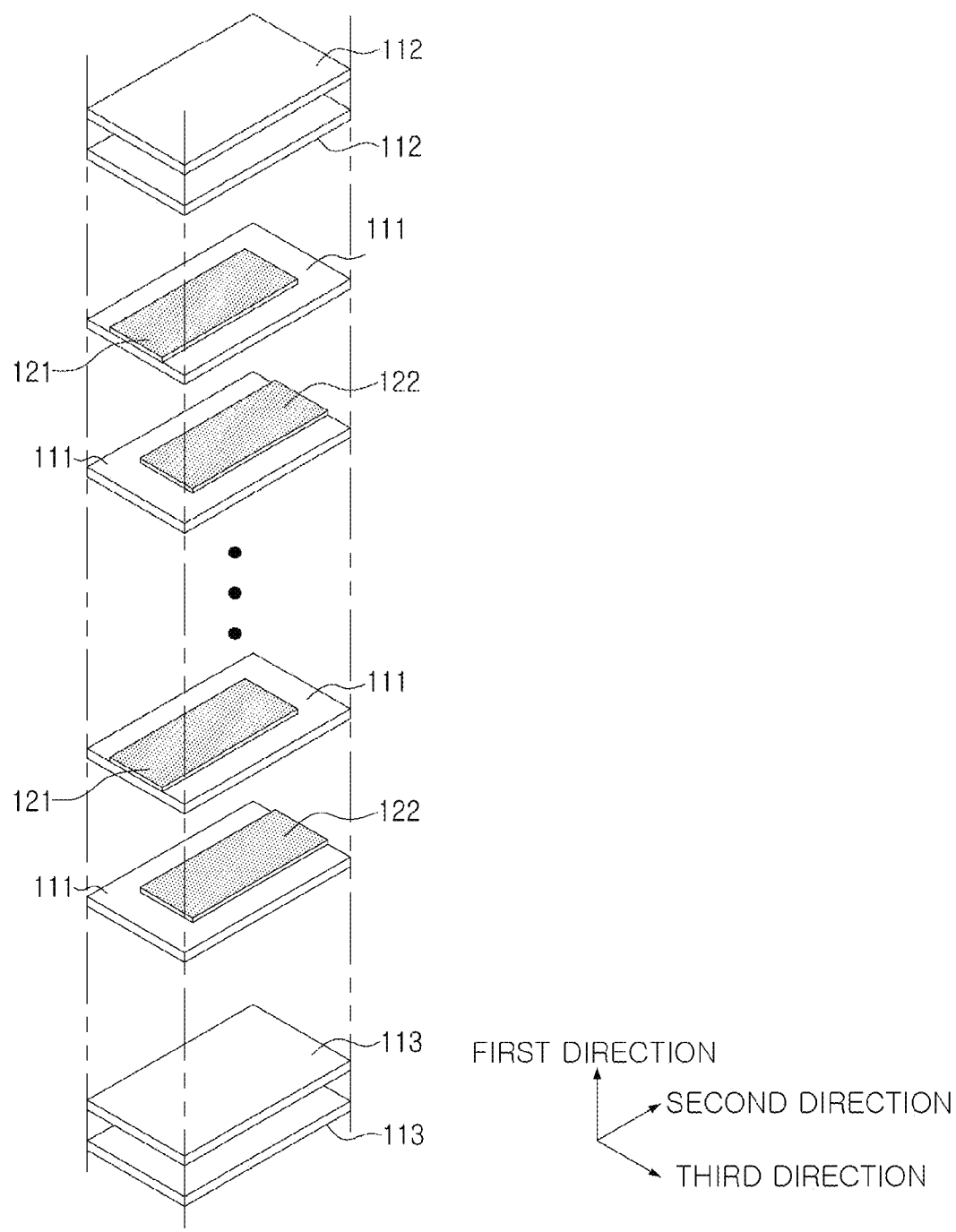
FIG. 9 is an exploded perspective view schematically illustrating an exploded body in which a dielectric layer and an internal electrode are stacked according to an embodiment.

Hereinafter, a multilayer electronic component according to an embodiment will be described in detail with reference to FIGS. 1 to 5 and 9, in which FIG. 1 schematically illustrates a perspective view of a multilayer electronic component according to an embodiment, FIG. 2 schematically illustrates a cross-sectional view taken along line I-I' of FIG. 1, FIG. 3 schematically illustrates a cross-sectional view taken along line II-II' of FIG. 1, FIG. 4 is an enlarged view of region B of FIG. 2, FIG. 5 is an enlarged view of region C of FIG. 4, and FIG. 9 is an exploded perspective view schematically illustrating an exploded body in which a dielectric layer and an internal electrode are stacked according to an embodiment.

A multilayer electronic component 100 according to an embodiment includes a body 110 that includes a dielectric layer 111 and internal electrodes 121 and 122 alternately disposed with the dielectric layer interposed therebetween, and external electrodes 130 and 140 disposed on the body. The external electrodes include electrode layers 131 and 141 connected to the internal electrodes, intermetallic compound layers 132 and 142 disposed on the electrode layers 131 and 141 and including first intermetallic compounds 132a and glasses 132b, and conductive resin layers 133 and 143 that are disposed on the intermetallic compound layers 132 and 142 and include conductive connection portions 133c including a second intermetallic compound and a low-melting-point metal, a plurality of metal particles 133a and resins 133b. A ratio of length of a first direction component in a region in which the first intermetallic compound 132a is formed with respect to a length of a first direction component of the metallic compound layer 132 is 20% or more.

In the body 110, a dielectric layer 111 and internal electrodes 121 and 122 are alternately stacked.

A detailed shape of the body 110 is not particularly limited, but as illustrated, the body 110 may have a hexahedral shape or a similar shape. Due to the shrinkage of the ceramic powder included in the body 110 during the sintering process, the body 110 may not have a perfectly straight hexahedral shape, but may have a substantially hexahedral shape.

The body 110 may include first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

The plurality of dielectric layers 111 forming the body 110 are in a sintered state, and the boundary between the adjacent dielectric layers 111 may be integrated to the extent that it is difficult to check without using a scanning electron microscope (SEM).

According to an embodiment, the raw material for forming the dielectric layer 111 is not particularly limited as long as sufficient capacitance may be obtained. For example, a barium titanate-based material, a lead composite perovskite-based material, a strontium titanate-based material, or the like may be used. The barium titanate-based material may include $BaTiO_3$-based ceramic powder. As an example of the ceramic powder, $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which calcium (Ca) or zirconium (Zr) is partially solubilized in $BaTiO_3$, may be used.

As a material for forming the dielectric layer 111, various ceramic additives, organic solvents, binders, dispersants, and the like may be added to powder such as barium titanate ($BaTiO_3$) or the like according to the usage of the present disclosure.

The body 110 may include a capacitance forming portion A disposed inside of the body 110 and including the first internal electrode 121 and the second internal electrode 122 face each other with the dielectric layer 111 interposed therebetween, and cover portions 112 and 113 formed on upper and lower portions of the capacitance forming portion A.

In addition, the capacitance forming portion A is a part contributing to capacitance formation of the capacitor, and may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on the upper and lower surfaces of the capacitance forming portion A in a thickness direction (e.g., the first direction), respectively, and may basically serve to prevent the internal electrodes from being damaged due to physical or chemical stress.

The upper cover portion 112 and the lower cover portion 113 do not include an internal electrode and may include the same material as the dielectric layer 111.

For example, the upper cover portion 112 and the lower cover portion 113 may include a ceramic material, for example, a barium titanate ($BaTiO_3$)-based ceramic material.

In addition, margin portions 114 and 115 may be disposed on side surfaces of the capacitance forming portion A.

The margin portions 114 and 115 may include a margin portion 114 disposed on the sixth surface 6 of the body 110 and a margin portion 115 disposed on the fifth surface 5 of the body 110. For example, the margin portions 114 and 115 may be disposed on both sides of the ceramic body 110 in a width direction (e.g., the third direction).

As illustrated in FIG. 3, the margin portions 114 and 115 may indicate a region between both ends of the first and second internal electrodes 121 and 122 and a boundary surface of the body 110 in the cross-section of the body 110 cut in the first and third (thickness-width) directions.

The margin portions 114 and 115 may basically serve to prevent damage to the internal electrodes due to physical or chemical stress.

The margin portions 114 and 115 may be formed by forming internal electrodes by applying a conductive paste on the ceramic green sheet except a position thereof in which the margin portions are to be formed.

In addition, to suppress the step difference due to the internal electrodes 121 and 122, the internal electrodes are stacked and then cut to be exposed to (or be in contact with or extend from) the fifth and sixth surfaces 5 and 6 of the body. Then, the margin portions 114 and 115 may also be formed as a single dielectric layer or two or more dielectric layers are laminated on both sides of the capacitance forming portion A in the width direction.

The internal electrodes 121 and 122 may be alternately disposed with the dielectric layer 111 that is interposed therebetween.

The internal electrodes 121 and 122 may include first and second internal electrodes 121 and 122. The first and second internal electrodes 121 and 122 may be alternately disposed to face each other, with the dielectric layer 111 interposed therebetween, the dielectric layers 111 constituting the body 110, and may be in contact with the first and second external electrodes on the third and fourth surfaces 3 and 4 of the body 110, respectively.

Referring to FIG. 2, the first internal electrode 121 may be spaced apart from the fourth surface 4 and in contact with the first external electrode on the third surface 3, and the second internal electrode 122 may be spaced apart from the third surface 3 and be in contact with the second external electrode on the fourth surface 4.

In this case, the first and second internal electrodes 121 and 122 may be electrically separated from each other by the dielectric layer 111 disposed therebetween.

Referring to FIG. 9, the body 110 may be formed by alternately stacking a ceramic green sheet on which the first internal electrode 121 is printed and a ceramic green sheet on which the second internal electrode 122 is printed, and then sintering the same.

The conductive metal included in the internal electrodes 121 and 122 may be one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In addition, in the case of the internal electrodes 121 and 122, internal electrodes may be formed by printing a conductive paste on a ceramic green sheet, and a screen-printing method or a gravure printing method may be used as a printing method of the conductive paste for the internal electrodes.

According to an embodiment, the external electrodes may include electrode layers 131 and 141 connected to the internal electrodes 121 and 122; intermetallic compound layers 132 and 142 disposed on the electrode layers and including first intermetallic compounds 132a and glasses 132b; and conductive resin layers 133 and 143 disposed on the intermetallic compound layers and including conductive connection portions 133c that include second intermetallic compounds and a low-melting-point metal, a plurality of metal particles 133a, and resins 133b. A ratio of length of a first direction component in a region in which the first intermetallic compounds 132a and 142a are formed with respect to a length of a first direction component of the intermetallic compound layers 132 and 142 may be 20% or more.

FIG. 4 is an enlarged view of region B of FIG. 2.

Although the region B is illustrated with an enlarged portion of the first external electrode 130, there is only a difference that the first external electrode 130 is electrically connected to the first internal electrode 121 and the second external electrode 130 is connected to the second external electrode 130. Therefore, the configurations of the first external electrode 130 and the second external electrode 140 are similar to each other. For example, the layers 134 and 135 of the first external electrode 130 may be respectively similar to the layers 144 and 145 of the second external electrode 140. Thus, the following description will be based on the first external electrode 130, but this is considered to include the description of the second external electrode 140.

The electrode layers 131 and 141 serve to mechanically bond the body and the external electrodes and serve to electrically and mechanically bond the internal electrodes and the external electrodes.

The electrode layers 131 and 141 are in contact with and are directly connected to the first and second internal electrodes 121 and 122 alternately exposed through one surface of the body 110 in a length direction (e.g., the second direction), thereby securing electrical conduction between the first and second external electrodes 130 and 140 and the first and second internal electrodes 121 and 122.

For example, the electrode layers 131 and 141 may be formed of a first electrode layer 131 and a second electrode layer 141, and the first electrode layer 131 is in contact with and directly connected to the first internal electrode 121 exposed through one surface of the body 110 in the length direction, thereby ensuring electrical conduction between the first external electrode 130 and the first internal electrode 121.

In addition, the second electrode layer 141 is in contact with and directly connected to the second internal electrode 122 exposed through the other surface of the body 110 in the length direction, thereby ensuring electrical conduction between the second external electrode 140 and the second internal electrode 122.

The electrode layers 131 and 141 may include a metal component, and examples of the metal component include nickel (Ni), copper (Cu), palladium (Pd), gold (Au), or alloys thereof. In more detail, sintered copper may be used as the metal component.

In this case, the electrode layers 131 and 141 may be formed to extend from the third and fourth surfaces 3 and 4 of the body 110 to portions of the first and second surfaces 1 and 2 of the body 110, respectively.

In addition, the electrode layers 131 and 141 may be formed to extend from the third and fourth surfaces 3 and 4 of the body 110 to portions of the fifth and sixth surfaces 5 and 6 of the body, respectively.

FIG. 5 is an enlarged view of region C of FIG. 4.

Referring to FIG. 5, the multilayer electronic component 100 according to an embodiment may include an intermetallic compound layer 132 disposed on the electrode layer 131.

The intermetallic compound layer 132 may include a first intermetallic compound 132a and a glass 132b.

In this case, the first intermetallic compound 132a may refer to an intermetallic compound formed by reacting a low-melting-point metal included in the conductive resin layer 133 with a metal included in the electrode layer 131.

For example, when copper (Cu) is included in the electrode layer 131 and the low-melting-point metal included in the conductive resin layer 133 is Sn, the first intermetallic compound 132a may be $Cu_3Sn$ formed by the reaction of Sn, which is a low melting point metal, with Cu included in the electrode layer 131 in the direction of the body 110. The intermetallic compound layer 132 serves to improve reliability and electrical connectivity. The intermetallic compound layer 132 may be disposed to cover the electrode layer 131.

According to an embodiment, the external electrode 130 may be formed by forming the electrode layer 131, and applying and sintering a low-melting-point paste on the electrode layer 131.

Therefore, the metal particles 133a included in the electrode layer 131 and the low-melting-point metal particles included in the paste are mutually diffused to form the first intermetallic compound 132a, and a first intermetallic compound is formed in the form of a layer at the interface between the electrode layer 131 and the conductive resin layer 133, thereby forming the intermetallic compound layer 132.

According to an embodiment, the conductive resin layer 133 that includes the conductive connection portion 133c including a second intermetallic compound and a low-melting-point metal, the plurality of metal particles 133a, and the resin 133b may be disposed on the intermetallic compound layer 132.

The second intermetallic compound may refer to an intermetallic compound formed by the reaction of a portion of the plurality of metal particles 133a in the conductive resin layer 133, with a low-melting-point metal.

Accordingly, the second intermetallic compound is formed in the conductive resin layer 133, and the conductive connection portion 133c may be formed by metal bonding with the low melting point metal remaining after the intermetallic compound is formed.

For example, when the conductive resin layer 133 is formed using an Ag—Sn-based epoxy resin paste, the second intermetallic compound may be $Ag_3Sn$ formed by the reaction of Ag with Sn, and when the conductive resin layer 133 is formed using a Cu—Sn-based epoxy resin paste, the second intermetallic compound may be $Cu_3Sn$ or $Cu_6Sn_5$.

The conductive resin layer 133 may serve to electrically and mechanically bond the intermetallic compound layer 132 and the first plating layer 134, serve to absorb tensile stress occurring in a mechanical or thermal environment when the multilayer electronic component 100 is mounted on a substrate to prevent cracks from occurring, and serve to protect the multilayer electronic component 100 from bending of the substrate.

The conductive connection portion 133c surrounds the plurality of metal particles 133a in a state in which metal has melted to be connected to each other, may significantly reduce the stress inside of the body 110, and improve high temperature load and moisture resistance load characteristics.

The conductive connection portion 133c may include the second intermetallic compound and the low-melting-point metal, and may thus have excellent electrical conductivity.

In the case of the related art, when the conductive resin layer 133 is formed on the electrode layer 131, bonding force is lowered due to the difference in components between the electrode layer 131 and the conductive resin layer 133, which may result in a problem of vulnerability to penetration of plating solution and external moisture.

In addition, in the case of the conductive resin layer 133, since a polymer such as epoxy are present in the final product after the process, there may be a problem in that sufficient bonding strength may not be secured in a high-temperature environment such as reflow or the like.

In detail, in a case in which the ratio of the length of a first direction component in a region in which the first intermetallic compound 132a is formed, with respect to the length of a first direction component of the intermetallic compound layer 132, is less than 20%, there is a fear that sufficient bonding strength between the electrode layer 131 and the conductive resin layer 133 may not be secured in a high temperature environment such as reflow. In this case, the reflow refers to a heat treatment for bonding solder by melt processing when the multilayer electronic component 100 is mounted on a substrate using the solder.

According to an embodiment of the present disclosure, the ratio of the length of the first direction component of the region in which the first intermetallic compound 132a is formed to the length of the first direction component of the intermetallic compound layer 132 is adjusted to 20% or more, to maintain sufficient bonding strength between the electrode layer 131 and the conductive resin layer 133 even in a high-temperature environment such as reflow or the like, thereby suppressing the occurrence of lifting at the interface between the electrode layer 131 and the conductive resin layer 133 and securing stable electrical connectivity between the electrode layer 131 and the conductive resin layer 133.

To secure sufficient bonding strength between the electrode layer 131 and the conductive resin layer 133, the ratio of length of the first direction component of the region in which the first intermetallic compound 132a is formed with respect to the length of the first direction component of the intermetallic compound layer 132 may be preferably 20% or more, in more detail, 22.1% or more.

In this case, the first direction may refer to a lamination direction or a thickness (T) direction, and the length of the first direction component may indicate the sum of the lengths of components disposed to be parallel to the first direction (stacking or thickness direction) among the total length.

In the case of the length of the first direction component of the region in which the first intermetallic compound 132a is formed, and the length of the first direction component of the intermetallic compound layer 132; after polishing to ½ of the width of the intermetallic compound layer 132 in the length-thickness directions, when the total thickness of the multilayer electronic component is T based on the central point of the intermetallic compound layer 132 in the thickness direction of the intermetallic compound layer 132 disposed on the head surfaces 3 and 4, the lengths may be the average value obtained by capturing an image of a region (D region) of thickness×length=(0.3 T to 0.4 T)×(20 μm) with a scanning electron microscope (SEM) and then measuring with the ImageJ program.

As in the embodiment, in a case in which the conductive resin layer 133 includes the conductive connection portion 133c, the plurality of metal particles 133a and the resin 133b, since the conductive connection portion 133c including metal particles and the plurality of metal particles 133a form a polymer-metal bond with the resin 133b, there is a problem in that bonding strength is lowered.

In addition, in a case in which the rigidity of the conductive resin layer 133 is weak, the inside of the conductive resin layer 133 is torn by outgassing generated in a high-temperature environment such as a reflow process, thereby deteriorating high-temperature reliability.

In an embodiment of the present disclosure, when the sum of the number of particles having a Feret diameter of 10 μm or more among the particles of the conductive connection portion 133c and the plurality of metal particles 133a is N1 and when the sum of the total number of the particles of the conductive connection portion 133c and the plurality of metal particles 133a is N2, a ratio (N1/N2) of N1 to N2 may be 15% or more.

Therefore, even in the case in which the bonding strength is relatively low due to the polymer-metal bonding, the conductive connection portion 133c and the plurality of metal particles 133a may serve to hold the resin 133b, thereby improving the bonding strength of the entire conductive resin layer 133.

Since the rigidity of the conductive resin layer 133 is increased due to the improvement in bonding strength, a phenomenon in which the inside of the conductive resin layer 133 is torn by outgassing generated in a high-temperature environment such as a reflow process may be prevented, thereby improving high-temperature reliability.

If N1/N2 is less than 15%, it is difficult for the conductive connection portion 133c and the plurality of metal particles 133a to hold the resin 133b, and thus, it may be difficult to secure excellent rigidity of the entire conductive resin layer 133.

Accordingly, N1/N2 may be preferably 15% or more, in more detail, 15.2% or more.

This configuration not only prevents lifting at the interface between the electrode layer 131 and the conductive resin layer 133, but also prevents tearing of the inside of the conductive resin layer 133, and accordingly, the entire external electrode 130 may have excellent high-temperature reliability and electrical conductivity.

The Feret diameter may refer to a distance between two tangent lines of the metal particles, facing each other. In detail, the Feret diameter according to an embodiment of the present disclosure may indicate a maximum Feret diameter obtained by measuring a maximum distance between tangential pairs of metal particles, but is not limited thereto. Even a minimum Feret diameter may be applied of course.

In addition, the maximum Feret diameter or the minimum Feret diameter may indicate a value calculated using an image analysis program (ImageJ). For example, after polishing to a point equal to ½ of the width in the length-thickness directions, when the total thickness of the multilayer electronic component is T based on the central point of the conductive resin layer 133 in the thickness direction of the conductive resin layer 133 disposed on the head surfaces 3 and 4, a region (region E) of thickness×length=(0.06 T to 0.08 T)×(15 μm to 25 μm) is imaged with a scanning electron microscope (SEM), and then, a value calculated for this region E using an image analysis program (ImageJ) may be obtained.

Since the conductive connection portion 133c may include the second intermetallic compound or the low-melting-point metal, the particles of the conductive connection portion 133c may include the second intermetallic compound particle or the low-melting-point metal particle.

The particle size of the conductive connection portion 133c may be sufficient as long as it is formed in a portion of the conductive resin layer 133.

The particles of the conductive connection portion 133c and the plurality of metal particles may be a cluster in which various materials form a single mass, and the boundary between the materials constituting the cluster may be integrated such that it is difficult to distinguish the boundary even on an image magnified by 5000 times with a scanning electron microscope (SEM).

As described above, even when the Feret diameter and dispersion of the conductive connection portion 133c, the low-melting-point metal, and the plurality of metal particles 133a included in the conductive resin layer are adjusted, the particles of the conductive materials may be disposed in a dispersed form.

In this case, since the specific gravity of hopping conduction is high, the electrical conductivity is relatively weak compared to the case in which the specific gravity of band conduction is high, and since the polymer-metal bond between the conductive resin layer 133 and the intermetallic compound layer 132 is dominant, the bonding force is weak. Therefore, there is a risk of lifting at the interface between the electrode layer 131 and the conductive resin layer 133 in a high-temperature environment.

Therefore, in an embodiment of the present disclosure, referring to FIG. 5, a portion of the conductive connection portion 133c included in the conductive resin layer 133 directly contacts a portion of the first intermetallic compound 132a included in the intermetallic compound layer 132, to improve electrical connectivity by increasing the specific gravity of band conduction, and the intermetallic compound layer 132 or the first plating layer 134 forms a metal bond with the conductive connection portion 133c, thereby further improving high-temperature reliability.

In a case in which the conductive resin layer 133 is formed on the electrode layer 131 including a conductive metal of the related art, the plating solution and external moisture are permeated at the interface between the electrode layer 131 and the conductive resin layer 133, causing a problem in which reliability of the multilayer electronic component 100 deteriorates.

Therefore, in an embodiment of the present disclosure, the external electrode 130 may be formed by forming the electrode layer 131 and by applying and sintering a low-melting-point paste on the electrode layer 131.

Accordingly, the metal particles included in the electrode layer 131 and the low-melting-point metal particles included in the paste may mutually diffuse to form the first intermetallic compound 132a in the form of a layer, and the conductive resin layer 133 may be formed on the intermetallic compound layer 132 including the first intermetallic compound 132a. For example, the first intermetallic compound 132a may be formed in the form of a layer between the electrode layer 131 and the conductive resin layer 133.

In this case, the first intermetallic compound 132a may be $Cu_3Sn$, and for example, may be $Cu_3Sn$ formed by combining Cu, which is a metal particle included in the electrode layer 131, with Sn, which is a low-melting point metal particle included in the conductive paste.

As the first intermetallic compound is $Cu_3Sn$, penetration of the plating solution and external moisture between the electrode layer 131 and the conductive resin layer 133 may be prevented, thereby further improving the reliability of the multilayer electronic component 100.

In addition, the conductive resin layer 133 is formed using a conductive paste of Ag—Sn-based-epoxy resin or Cu—Sn-based-epoxy resin, to thereby include a conductive connection portion including a second intermetallic compound and a low-melting-point metal, a plurality of metal particles and a resin on the intermetallic compound layer 132, by adjusting the amount of Sn solder.

In this case, the low-melting-point metal may preferably be a metal having a melting point of 300° C. or less.

For example, Sn having a melting point of 213° C. to 220° C. may be included. Sn is melted in the process of drying and curing, and the molten Sn wets high-melting-point metal particles such as Ag by capillary action, and reacts with the metal particles to form a second intermetallic compound.

In an embodiment, the second intermetallic compound included in the conductive connection portion 133 may be an intermetallic compound obtained by the reaction of Sn included in the conductive paste forming the conductive resin layer 133 with any one of Cu, Ag and Ag-coated Cu.

Accordingly, the second intermetallic compound may include at least one of $Cu_3Sn$, $Cu_6Sn_5$, and $Ag_3Sn$, the plurality of metal particles 133a may be Cu, Ag, or Ag-coated Cu that does not react with Sn or a Sn-based alloy, and the low-melting-point metal may be Sn or a Sn-based alloy that does not react with the plurality of metal particles 133a.

By forming the conductive resin layer 133 including the conductive connection portion 133c that includes a second intermetallic compound and a low-melting-point metal, the plurality of metal particles 133a, and a resin, on the intermetallic compound layer 132, the electrical connectivity may be further improved while improving the rigidity of the multilayer electronic component 100 against external impacts.

In an embodiment, the electrode layer 131 may include a conductive metal and glass. The glass included in the electrode layer may remain unreacted at the interface between the electrode layer and the conductive resin layer when the metal particles included in the electrode layer and Sn that is a low-melting metal particle included in the conductive paste are combined to form the intermetallic compound layer.

Accordingly, the glass 133b may be included in the intermetallic compound layer 133.

The resin 134b may include a thermosetting resin having electrical insulation properties.

In this case, the thermosetting resin may be, for example, an epoxy resin, but the present disclosure is not limited thereto.

The resin 134b may serve to mechanically connect the intermetallic compound layer 132 and the first plating layer 134, and impart elasticity to the external electrode 130 to serve to prevent cracks from occurring in the external electrode 130 from external deformation.

In an embodiment, the external electrode 130 may include a first plating layer 134 disposed on the conductive resin layer 133.

The first plating layer 134 serves to improve mounting characteristics. The type of the first plating layer 134 is not particularly limited, and may be a plating layer including at least one of Ni, Sn, Pd, and alloys thereof, and may be formed of a plurality of layers.

For example, the first plating layer 134 may be a Ni plating layer disposed on the conductive resin layer 133.

In this case, a portion of the conductive connection portion 133c may directly contact a portion of the first plating layer 134 to connect the first plating layer 134 and the intermetallic compound layer 132.

For example, referring to FIG. 4, a portion of the conductive connection portion 133c directly contacts a portion of the first intermetallic compound 132a included in the intermetallic compound layer 132, or directly contacts a portion of the first plating layer 134 to increase the specific gravity of the band conduction to improve the electrical connectivity and improve the physical bonding force, thereby further improving the high-temperature reliability.

In an embodiment, the external electrode 130 may include a second plating layer 135 disposed on the first plating layer 134.

The second plating layer 135 serves to improve the mounting characteristics. The type of the plating layer is not particularly limited, and may be a plating layer including at least one of Ni, Sn, Pd, and alloys thereof.

For example, a Sn plating layer disposed on the Ni plating layer may be included.

Hereinafter, a multilayer electronic component according to another embodiment will be described in detail, and a description overlapping with the above-described embodiment will be omitted.

A multilayer electronic component 100 according to another embodiment includes a body 110 including a dielectric layer 111 and internal electrodes 121 and 122 alternately disposed with the dielectric layer interposed therebetween, and external electrodes 130 and 140 disposed on the body 110. The external electrodes include electrode layers 131 and 141 connected to the internal electrodes; intermetallic compound layers 132 and 142 disposed on the electrode layers and including first intermetallic compounds 132a and glasses 132b; conductive resin layers 133 and 143 disposed on the intermetallic compound layer 132 and 142, and including conductive connection portions 133c that include a second intermetallic compound and a low-melting-point metal, a plurality of metal particles 133a, and resins 133b. When the sum of the number of particles having a Feret diameter of 10 µm or more among the particles of the conductive connection portion 133c and the plurality of metal particles 133a is N1 and the total number of particles of the conductive connection portion 133c and the plurality of metal particles 133a is N2; a ratio (N1/N2) of N1 to N2 is 15% or more.

In the related art case, when the conductive resin layer 133 includes the conductive connection portion 133c, the plurality of metal particles 133a and the resin 133b, the conductive connection portion 133c including the metal particles and the plurality of metal particles 133a forms a polymer-metal bond with the resin 133b, and thus, there is a problem in that the bonding strength is weak.

In addition, in the case in which the rigidity of the conductive resin layer 133 is weak, the inside of the conductive resin layer 133 is torn by outgassing generated in a high-temperature environment such as a reflow process, thereby deteriorating high-temperature reliability.

In an embodiment of the present disclosure, when the sum of the number of particles having a Feret diameter of 10 µm or more among the particles of the conductive connection portion 133c and the plurality of metal particles 133a is N1 and the sum of the total number of particles of the conductive connection portion 133c and the plurality of metal particles 133a is N2; a ratio (N1/N2) of N1 to N2 is 15% or more.

Therefore, even when the bonding force between the metal and the resin is relatively weak, the conductive connection portion 133c and the plurality of metal particles 133a serve to hold the resin 133b, thereby improving the bonding strength of the entire conductive resin layer 133.

Since the rigidity of the conductive resin layer 133 is increased due to the improvement in bonding strength, a phenomenon in which the inside of the conductive resin layer 133 is torn by outgassing generated in a high-temperature environment such as a reflow process may be prevented, thereby improving high-temperature reliability.

If N1/N2 is less than 15%, since it is difficult for the conductive connection portion 133c and the plurality of metal particles 133a to hold the resin 133b, and thus, securing excellent rigidity of the entire conductive resin layer 133 may be difficult.

Accordingly, N1/N2 may be preferably 15% or more, in more detail, 15.2% or more.

Since the conductive connection portion 133c may include the second intermetallic compound or the low-melting-point metal, the particles of the conductive connection portion 133c may include second intermetallic compound particles or low-melting-point metal particles.

The particle size of the conductive connection portion 133c may be sufficient as long as the size may be formed in a portion of the conductive resin layer 133.

The particles of the conductive connection portion 133c and the plurality of metal particles may be a cluster in which various materials form a single mass, and the boundary between the materials constituting the cluster may be integrated such that it is difficult to distinguish the boundary even on an image magnified by 5000 times, with a scanning electron microscope (SEM).

The multilayer electronic component 100 according to another embodiment may have the same configuration as the above-described embodiments of the multilayer electronic component 100.

Therefore, the description overlapping with the embodiment described above will be omitted.

Hereinafter, a method of manufacturing a multilayer electronic component according to an embodiment will be described in detail, but the present disclosure is not limited thereto. In the descriptions regarding the method of manufacturing a multilayer electronic component according to an embodiment, descriptions overlapping with the above-described multilayer electronic component will be omitted.

In a method of manufacturing a multilayer electronic component according to an embodiment, a plurality of ceramic green sheets are prepared by first applying and drying a slurry formed to include powder such as barium titanate ($BaTiO_3$) or the like on a carrier film.

The ceramic green sheet is prepared by mixing ceramic powder, a binder, and a solvent to prepare a slurry and by preparing the slurry in a sheet type having a thickness of several μm by a doctor blade method or the like.

Next, an internal electrode is formed by applying a conductive paste for internal electrodes including a conductive metal such as nickel powder on the green sheet by a screen-printing method or the like.

Thereafter, a plurality of green sheets on which internal electrodes are printed are laminated to prepare a laminate. In this case, a cover may be formed by stacking a plurality of layers of green sheets on which internal electrodes are not printed on the upper and lower surfaces of the laminate.

Next, after the body is prepared by sintering the laminate, electrode layers are formed on the third and fourth surfaces of the body to be respectively electrically connected to the first and second internal electrodes, respectively.

The body includes a dielectric layer, an internal electrode, and a cover, the dielectric layer is formed by sintering a green sheet on which the internal electrode is printed, and the cover is formed by sintering a green sheet on which the internal electrode is not printed.

The internal electrode may be formed of first and second internal electrodes having different polarities. Next, an electrode layer is formed on one surface and the other surface of the body.

The electrode layer may be formed by applying a conductive paste for forming an external electrode including copper and glass, which are conductive metals, on one surface and the other surface of the body.

The method of forming the electrode layer may be performed by a dipping method, but is not limited thereto, and the electrode layer may also be formed using a sheet transfer method, an electroless plating method, or a sputtering method.

Next, a low-melting-point paste containing a plurality of metal particles, a resin, and a low-melting-point metal is applied and dried on the electrode layer, and then cured and heat treated to form a first intermetallic compound layer formed of a first intermetallic compound. Then, a conductive resin layer formed of a conductive connection portion, a plurality of metal particles, and a resin is formed and disposed on the first intermetallic compound layer.

For example, the low-melting paste may be prepared by mixing Ag powder, Cu powder, Ag-coated Cu powder, Sn-based solder powder and a thermosetting resin, and then dispersing the same using a 3-roll mill. The Sn-based solder powder may include at least one selected from Sn, $Sn_{96.5}Ag_{3.0}Cu_{0.5}$, $Sn_{42}Bi_{58}$ and $Sn_{72}Bi_{28}$, and the particle size of Ag contained in the Ag powder may be 0.5 to 3 μm, but the present disclosure is not limited thereto.

The low-melting-point paste is applied to the external side of the electrode layer, dried and cured to form a first intermetallic compound, a second intermetallic compound, and a conductive resin layer.

The thermosetting resin may include, for example, an epoxy resin, and the present disclosure is not limited thereto, and may be, for example, a bisphenol A resin, a glycol epoxy resin, a novolak epoxy resin, or a resin of a derivative thereof having a low molecular weight and being liquid at room temperature among derivatives thereof.

A method of adjusting the length of the first intermetallic compound 132a included in the intermetallic compound layer 132 or a method of controlling the proportion of the particle size of the conductive connection portion 133c, the plurality of metal particles 133a, and the low-melting-point metal included in the conductive resin layer 133 may be varied.

In detail, the curing temperature, the amount of Sn-based solder powder, the amount of the thermosetting resin, and the sintering atmosphere may be closely controlled, but the present disclosure is not limited thereto.

Furthermore, the method may further include forming a first plating layer and a second plating layer on the conductive resin layer.

For example, a nickel plating layer as the first plating layer may be formed on the conductive resin layer, and a tin plating layer as the second plating layer may be formed on the nickel plating layer.

Example 1

The ratio of the length of the region in which the first intermetallic compound 132a is formed to the total length of the intermetallic compound layer 132 was measured, and whether or not there was a lifting defect was described in [Table 1].

Figure 7A:
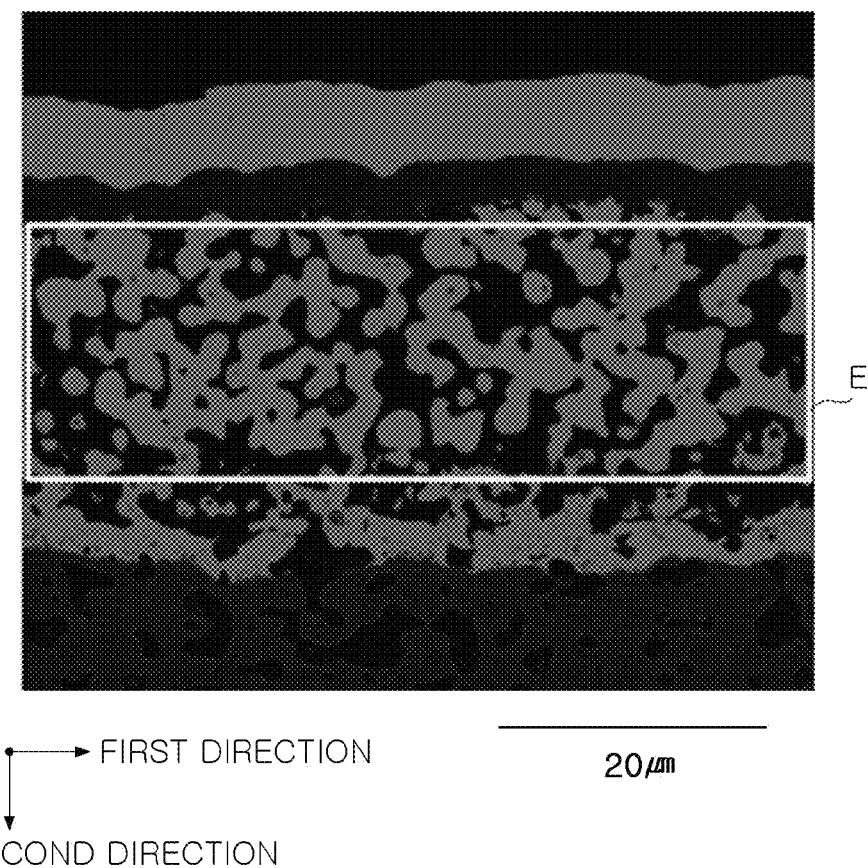
FIG. 7A is an image taken with a scanning electron microscope (SEM) of a region in which a conductive material is generated in a cross section vicinity region B of the multilayer electronic component according to an embodiment.

Referring to FIG. 7A, after polishing to a point equal to ½ of the width of the intermetallic compound layer 132 in the length-thickness directions thereof, when, based on the central point of the intermetallic compound layer 132 in the thickness direction of the intermetallic compound layer 132 disposed on the head surfaces 3 and 4, the total thickness of the multilayer electronic component is T, in the region (D region) of thickness×length=(0.3 T to 0.4 T)×(20 μm), one cut surface per sample in 20 samples was imaged with a scanning electron microscope (SEM), and then the area in which the conductive material was formed was colored.

Figure 6A:
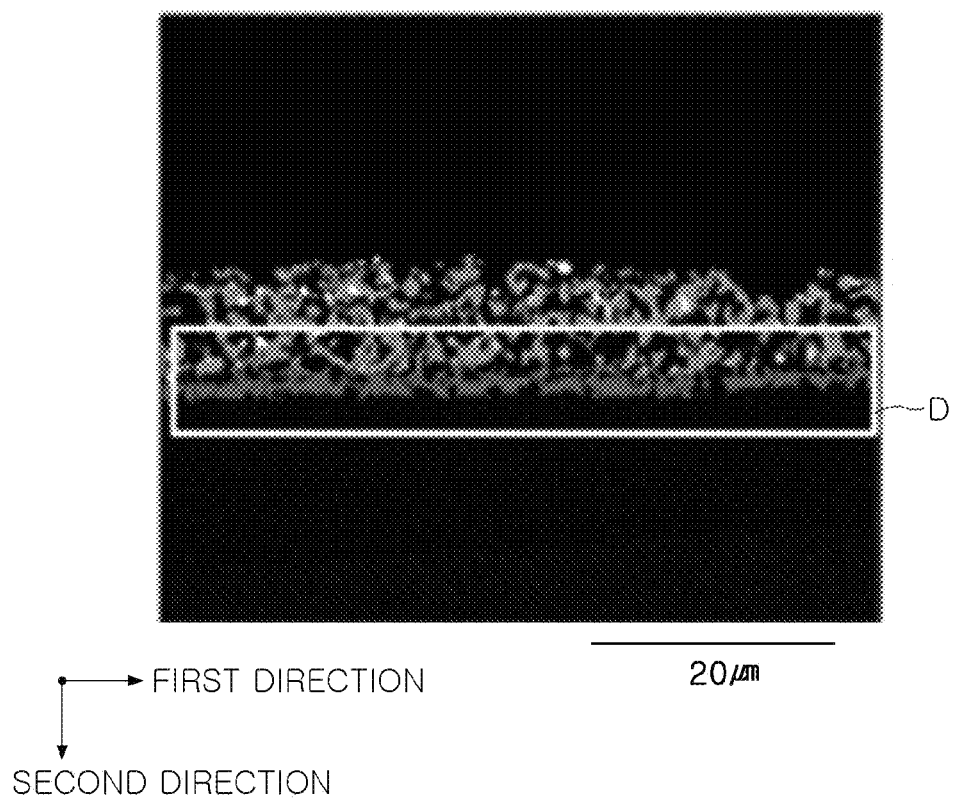
FIG. 6A is an image taken with a scanning electron microscope (SEM) of a region in which a first intermetallic compound is generated in a cross section vicinity region B of the multilayer electronic component according to an embodiment.

FIG. 6A is an image in which the color of the point where the first intermetallic compound 132a is formed is changed to black and white through the ImageJ program.

The sum of the lengths of the changed region in the thickness direction (first direction) was provided as the length of the region in which the first intermetallic compound 132a is formed, and the total length, in the thickness direction (first direction), of the region including the region in which the first intermetallic compound 132a is formed and the region where the first intermetallic compound 132a is not formed was provided as the total length of the intermetallic compound layer 132.

Figure 6B:
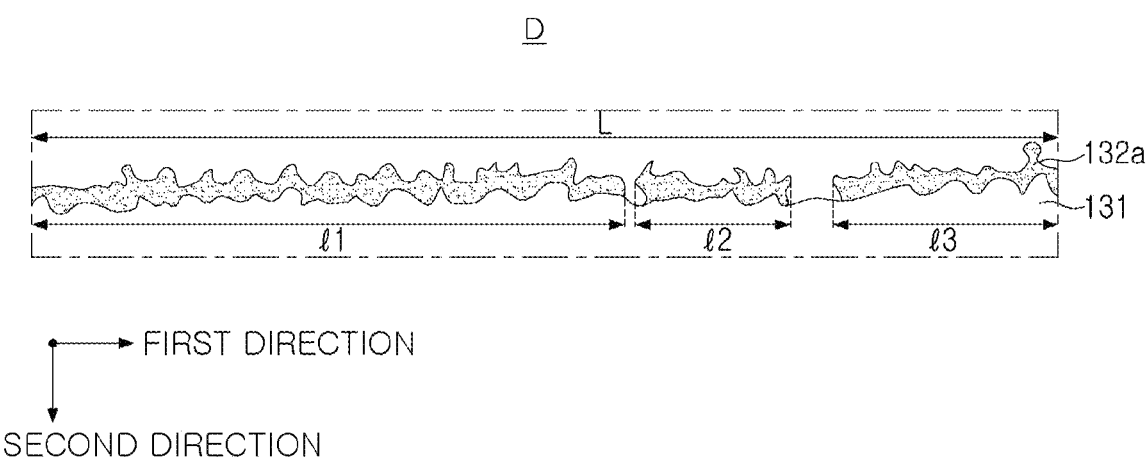
FIG. 6B is a black-and-white view of region D of FIG. 6A.

For example, referring to FIG. 6B, the region in which the first intermetallic compound 132a is formed in the region D is displayed in black, and the glass 132b, the electrode layer 131, voids and the like, except for the first intermetallic compound 132a, are not displayed in black.

In the region in which the first intermetallic compound 132a is formed, a value (ℓ1+ℓ2+ℓ3) obtained by adding all the lengths of the first direction components is the length of the region in which the first intermetallic compound 132a is formed, and the total length of the first direction component of the interface between the intermetallic compound layer 132 and the electrode layer 131 including the length of the region in which the intermetallic compound 132a is not formed is the total length (L) of the intermetallic compound layer 132.

Accordingly, in this case, the ratio of the length of the region in which the first intermetallic compound 132a is formed to the total length of the intermetallic compound layer 132 corresponds to (ℓ1+ℓ2+ℓ3)/L).

In checking whether or not lifting occurred, 30 samples per test number were mounted in the first direction-second direction or in the second direction-third direction, and the reflow was repeated 5 times in the mounted state.

After that, the sample mounted on the board as it was cut, and images of both surfaces of the external electrode for each sample were respectively captured with X-rays. It was evaluated that lifting occurred when there is a bright band on the external electrode, and it was evaluated that lifting did not occur when there is no bright band thereon.

In addition, in 30 samples, when no lifting occurred at all (0%), it was described as OK, and when lifting occurred even 1%, it was described as NG.

TABLE 1

| Test Number | Ratio (%) of length of region in which first intermetallic compound is formed, to total length of intermetallic compound layer | Defect of Lifting (Lifting/Number of evaluations) |
|---|---|---|
| 1 | 95.3 | OK(0/60) |
| 2 | 84.6 | OK(0/60) |
| 3 | 22.1 | OK(0/60) |
| 4* | 15.2 | NG(5/60) |
| 5* | 6.0 | NG(48/60) |

*Comparative Example

In the case of Test Nos. 1 to 3, the ratio of the length of the region in which the first intermetallic compound 132a is formed to the total length of the intermetallic compound layer 132 is 20% or more. In this case, it could be confirmed that the occurrence of lifting at interfaces between the electrode layer 131 and the conductive resin layer 133 may be suppressed.

In the case of Test Nos. 4 to 5, the ratio of the length of the region in which the first intermetallic compound 132a is formed with respect to the total length of the intermetallic compound layer 132 is less than 20%. In this case, the effect of suppressing the occurrence of lifting could not be confirmed.

Example 2

After measuring the degree of internal lifting of the conductive resin layer according to the ratio of the internal network structure included in the conductive resin layer 133, the measurement results are illustrated in Table 2.

The ratio of the internal network structure may be measured as follows.

Referring to FIG. 7A, after polishing to a point equal to ½ of the width in the length-thickness directions, when the total thickness of the multilayer electronic component is T, based on the central point of the conductive resin layer 133 in the thickness direction of the conductive resin layer 133 disposed on the head surfaces 3 and 4; in the region (region E) of thickness×length=(0.06 T to 0.08 T)×(15 μm to 25 μm), one cut surface per sample in 20 samples was imaged with a scanning electron microscope (SEM).

Figure 7B:
FIGS. 7B and 7C are images and diagrams obtained by processing region E of FIG. 7A in black and white.

Referring to FIG. 7B, the region in which the conductive connection portion 113c, the plurality of metal particles 113a, and the low-melting-point metal were formed was subjected to black-and-white processing using the ImageJ program. Therefore, as illustrated in FIG. 7B, the resin 133b in the region E is not subjected to black-and-white processing.

In this case, the Feret diameters D1, D2, D3, D4, D5 and D6 of the clusters displayed in black and white are measured using the ImageJ program.

Figure 7C:
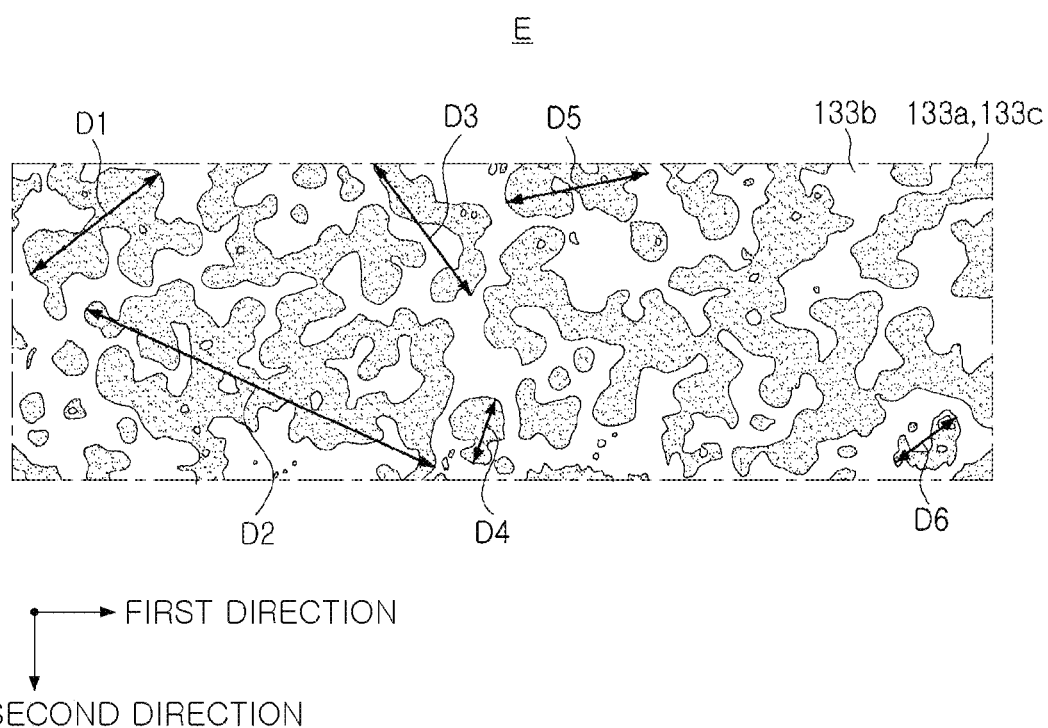
Figure 8:
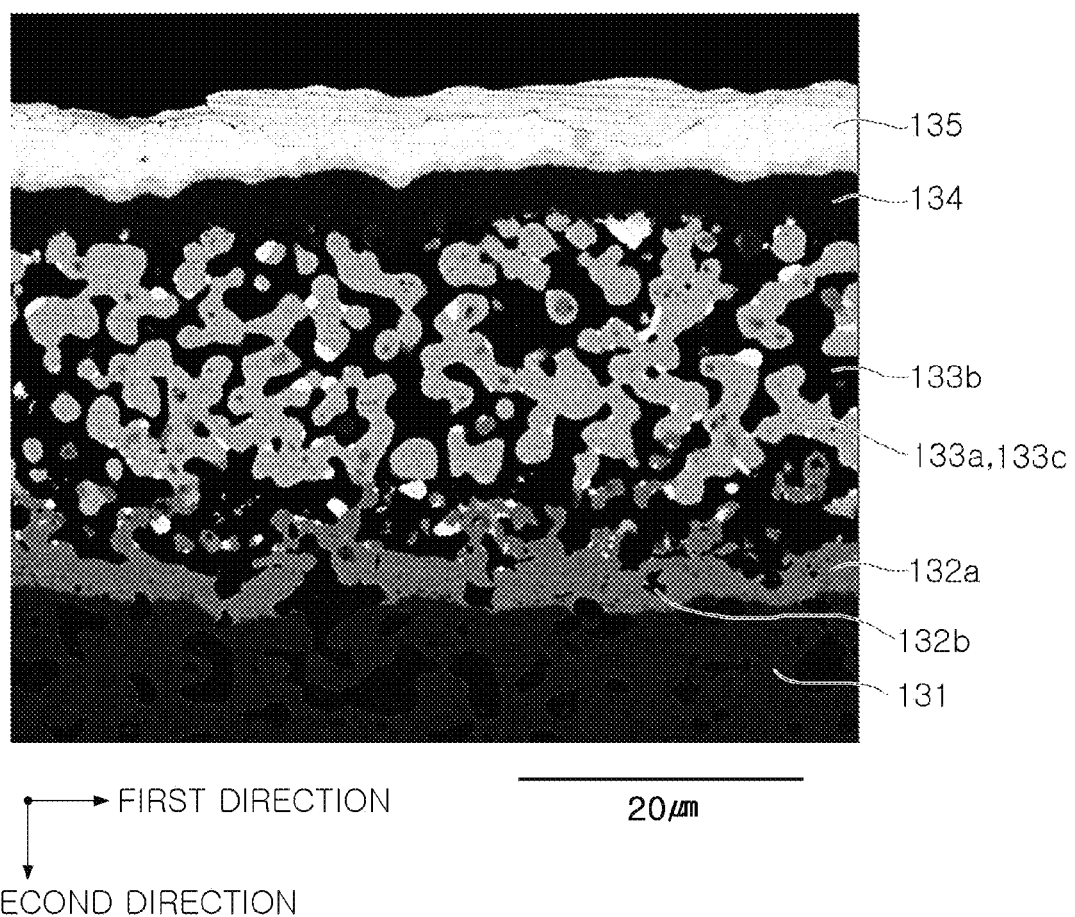
FIG. 8 is an image taken with a scanning electron microscope (SEM) of a cross section in the vicinity of region B of a multilayer electronic component according to an embodiment.

Referring to FIG. 7C, a Feret diameter may refer to a distance between two tangent lines of a cluster, facing each other.

The measured Feret diameter may be a maximum Feret diameter. For example, the Feret diameter may indicate a maximum distance between tangential pairs of a cluster.

In an example or another example of the present disclosure, to significantly reduce an error, the cluster caught on an outer edge of the region E had a Feret diameter twice the measured Feret diameter, and 0.5 μm or less of clusters were excluded to remove noise. In this case, when the number of clusters having a Feret diameter of 10 μm or more was N1 and the total number of clusters was N2, whether or not the tear occurrence of the conductive resin layer 133 according to N1/N2 was measured.

In checking whether or not a tear occurred, 30 samples per test were mounted in the first direction-second direction or in the second direction-third direction, and the reflow was repeated 5 times in the mounted state.

The substrate on which the sample is mounted is cut as it is, and both sides of the external electrode were imaged with X-rays for each sample. When there is a bright band on the external electrode, it was evaluated that tearing occurred. When there is no bright band, it was evaluated that no tearing occurred. Then, it was additionally confirmed whether a tear occurred through cross-sectional analysis.

In [Table 2], in 20 samples, when no tearing occurred (0%), it was recorded as OK, and when tearing occurred even 1%, it was recorded as NG.

TABLE 2

| Test Number | N1/N2(%) | Torn resin layer |
|---|---|---|
| 1* | 14.7 | NG(7/60) |
| 2 | 15.2 | OK |
| 3 | 21.7 | OK |
| 4 | 29.9 | OK |
| 5 | 31 | OK |
| 6 | 32 | OK |
| 7 | 33.4 | OK |
| 8 | 33.6 | OK |

*Comparative Example

In the case of Test No. 1, N1/N2 was less than 15%, and it was not confirmed that lifting due to tearing inside of the conductive resin layer was suppressed.

In the case of Test Nos. 2 to 8, it was confirmed that the N1/N2 was 15% or more to prevent tearing in the conductive resin layer and lifting was suppressed.

Therefore, as in the embodiment, by adjusting N1/N2 to be 15% or more, not only lifting at the interface between the electrode layer 131 and the conductive resin layer 133 may be prevented, but also tearing in the conductive resin layer 133 may be prevented. Accordingly, the entire external electrode 130 may have excellent reliability and electrical conductivity.

As set forth above, according to an embodiment, the reliability of the multilayer electronic component may be improved.

The adhesion at the interface between the conductive resin layer and the sintered electrode layer may be improved to suppress the occurrence of interfacial lifting.

The problem in which electrical conductivity is weakened due to the dispersed form of conductive particles included in the conductive resin layer may be prevented.

The occurrence of lifting at the interface between the sintered electrode layer and the conductive resin layer due to outgassing generated from the conductive resin layer in a high-temperature environment such as reflow may be suppressed.

The problem in which the inside of the conductive resin layer is torn and lifted in addition to lifting at the interface between the sintered electrode layer and the conductive resin layer due to outgassing generated from the conductive resin layer in a high-temperature environment such as reflow may be suppressed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer electronic component comprising:
a body including a dielectric layer and an internal electrode; and
an external electrode disposed on the body,
wherein the external electrode includes:
an electrode layer connected to the internal electrode,
an intermetallic compound layer disposed on the electrode layer and including a plurality of portions spaced apart from each other in a cross section, each portion having a first intermetallic compound, and
a conductive resin layer disposed on the intermetallic compound layer and including a conductive connection portion including a second intermetallic compound and a low-melting-point metal, a plurality of metal particles, and a resin,
in the cross section, a ratio of a length of a first direction component of a region having the plurality of portions having the first intermetallic compound, with respect to a length of a first direction component of the intermetallic compound layer, is 20% or more, and
the intermetallic compound layer include glass to be disposed between two portions among the plurality of portions having the first intermetallic compound.

2. The multilayer electronic component of claim 1, wherein a sum of a number of particles having a Feret diameter of 10 µm or more, among particles of the conductive connection portion and the plurality of metal particles, is N1, a total number of the particles of the conductive connection portion and the plurality of metal particles is N2, and a ratio (N1/N2) of the N1 to the N2 is 15% or more.

3. The multilayer electronic component of claim 1, wherein a portion of the conductive connection portion is in direct contact with a portion of the first intermetallic compound included in the intermetallic compound layer.

4. The multilayer electronic component of claim 1, wherein the first intermetallic compound includes $Cu_3Sn$.

5. The multilayer electronic component of claim 1, wherein the second intermetallic compound included in the conductive connection portion comprises at least one of $Cu_3Sn$, $Cu_6Sn_5$ and $Ag_3Sn$.

6. The multilayer electronic component of claim 1, wherein the plurality of metal particles include at least one of silver (Ag), copper (Cu), and silver (Ag)-coated copper (Cu), and the low-melting-point metal included in the conductive connection portion includes tin (Sn) or a tin (Sn) alloy.

7. The multilayer electronic component of claim 1, wherein the electrode layer comprises a conductive metal and glass.

8. The multilayer electronic component of claim 1, wherein the external electrode comprises a first plating layer disposed on the conductive resin layer.

9. The multilayer electronic component of claim 8, wherein a portion of the conductive connection portion is in direct contact with a portion of the first plating layer and a portion of the first intermetallic compound included in the intermetallic compound layer.

10. The multilayer electronic component of claim 8, further comprising a second plating layer disposed on the first plating layer.

11. A multilayer electronic component comprising:
a body including a dielectric layer and an internal electrode; and
an external electrode disposed on the body,
wherein the external electrode includes:
an electrode layer connected to the internal electrode,
an intermetallic compound layer disposed on the electrode layer and including a first intermetallic compound, and
a conductive resin layer disposed on the intermetallic compound layer and including a conductive connection portion including a second intermetallic compound and a low-melting-point metal, a plurality of metal particles, and a resin, and
a sum of a number of particles having a Feret diameter of 10 µm or more, among particles of the conductive connection portion and the plurality of metal particles, is N1, a total number of the particles of the conductive connection portion and the plurality of metal particles is N2, and a ratio (N1/N2) of the N1 to the N2 is 15% or more.

12. The multilayer electronic component of claim 11, wherein a portion of the conductive connection portion is in direct contact with a portion of the first intermetallic compound included in the intermetallic compound layer.

13. The multilayer electronic component of claim 11, wherein the first intermetallic compound includes $Cu_3Sn$.

14. The multilayer electronic component of claim 11, wherein the second intermetallic compound included in the conductive connection portion comprises at least one of $Cu_3Sn$, $Cu_6Sn_5$ and $Ag_3Sn$.

15. The multilayer electronic component of claim 11, wherein the plurality of metal particles comprise at least one of silver (Ag), copper (Cu), and silver (Ag)-coated copper (Cu), and the low-melting-point metal included in the conductive connection portion includes tin (Sn) or a tin (Sn) alloy.

16. The multilayer electronic component of claim 11, wherein the electrode layer comprises a conductive metal and glass.

17. The multilayer electronic component of claim 11, wherein the external electrode comprises a first plating layer disposed on the conductive resin layer.

18. The multilayer electronic component of claim 17, wherein a portion of the conductive connection portion is in direct contact with a portion of the first plating layer and a portion of the first intermetallic compound included in the intermetallic compound layer.

19. The multilayer electronic component of claim 17, further comprising a second plating layer disposed on the first plating layer.

20. The multilayer electronic component of claim 11, wherein the intermetallic compound layer further includes glass.

21. A multilayer electronic component comprising:
   a body including a dielectric layer and an internal electrode; and
   an external electrode disposed on the body,
   wherein the external electrode includes:
      an electrode layer connected to the internal electrode,
      an intermetallic compound layer disposed on the electrode layer and including $Cu_3Sn$ and glass, and
      a conductive resin layer disposed on the intermetallic compound layer and including a conductive connection portion including a second intermetallic compound and a low-melting-point metal, a plurality of metal particles, and a resin, and
   a portion of the conductive connection portion is in direct contact with a portion of the $Cu_3Sn$ included in the intermetallic compound layer.

22. The multilayer electronic component of claim 21, wherein the second intermetallic compound included in the conductive connection portion comprises at least one of $Cu_3Sn$, $Cu_6Sn_5$ and $Ag_3Sn$.

23. The multilayer electronic component of claim 21, wherein the plurality of metal particles include at least one of silver (Ag), copper (Cu), and silver (Ag)-coated copper (Cu), and the low-melting-point metal included in the conductive connection portion includes tin (Sn) or a tin (Sn) alloy.

* * * * *